United States Patent [19]
Brackmann et al.

[11] 3,888,610
[45] June 10, 1975

[54] FORMATION OF POLYMERIC FIBRES

[75] Inventors: Warren A. Brackmann, Cooksville; Daniel Diianni, Toronto, both of Ontario, Canada

[73] Assignee: Rothmans of Pall Mall Canada Limited, Toronto, Ontario M6A 2W4, Canada

[22] Filed: Aug. 24, 1973

[21] Appl. No.: 391,266

[52] U.S. Cl. .................................. 425/72; 425/464
[51] Int. Cl. .......................... D01d 3/00; D01d 7/00
[58] Field of Search ............ 425/464, 461, 464, 72, 425/131.5; 264/176 F

[56] References Cited
UNITED STATES PATENTS

| | | |
|---|---|---|
| 3,081,490 | 3/1963 | Heynen et al............... 425/131.5 X |
| 3,121,254 | 2/1964 | Heynen et al...................... 425/464 |
| 3,437,725 | 4/1969 | Pierce............................. 264/176 F |
| 3,694,131 | 9/1972 | Stuart ................................ 425/461 |
| 3,825,379 | 7/1974 | Lohkamp et al...................... 425/72 |

*Primary Examiner*—Robert D. Baldwin
*Attorney, Agent, or Firm*—Sim & McBurney

[57] ABSTRACT

An extrusion head for the extruding of microfine polymeric fibres suitable for formation into cigarette filter elements of particular construction is provided with inexpensively replaceable wearable components. Molten material is extruded through a plurality of individual conduits in the head to discharge points. Hot air under pressure is directed parallel to each individual conduit at its discharge point whereby individual filaments are extruded.

13 Claims, 5 Drawing Figures

PATENTED JUL 10 1975 3,893,610

SHEET 1

FORMATION OF POLYMERIC FIBRES

FIELD OF INVENTION

The present invention is directed to the formation of polymeric fibres, in particular to apparatus for the production of polymeric fibres, and extrusion head therefor, and to a method of producing cigarette filters including polymeric fibres.

CROSS-REFERENCE TO RELATED APPLICATION

In copending U.S. application Ser. No. 352,868 filed Apr. 20, 1973, there is described a filter for tobacco smoke which consists wholly of or includes elements constructed wholly of non-crimped fibres of thermoplastic polymeric non-absorbent material having a diameter less than about 5 microns. The present invention is directed to the production of fibres suitable for use in or for formation into such filters.

BACKGROUND TO THE INVENTION

In an article entitled "Superfine Thermoplastic Fibres" by Wente, there is described an apparatus for producing thermoplastic fibres of extremely small fibre size. The apparatus includes a ram extruder which forces molten material through a row of fine orifices and directly into two converging high velocity streams of heated air or other gas. In the nozzle, the fine orifices are provided by slots milled into a flat surface of one half of the nozzle and then matched with identical slots milled into a abutting surface of the other half of the nozzle. When the two halves of the nozzle are placed together, they form a row of openings. The two converging high velocity streams of air are provided by two elongated openings, in the nozzle extending parallel to the row of orifices slightly beyond the two lateral extremities of the row.

This prior art arrangement suffers from a number of defects. Under the pressure of the ram extruder, unless the two abutting surfaces of the nozzle are machined extremely precisely and an extremely high clamping force is used to hold the two parts together, molten material may be extruded other than at the orifices, which is highly undesirable. In addition, the area surrounding the orifices tends to erode during prolonged use, producing unsatisfactory results and necessitating the complete replacement of the nozzle from time to time. In view of the fine machining required for the two halves of the nozzle, the periodic replacement of the whole nozzle structure is extremely expensive.

Further, as is described in the Wente article, the angle of discharge of the air relative to the orifices is critical, in that at an angle between the convergent air streams below about 30°, a high proportion of bundles of fibres is obtained, a serious drawback to uniformity of product. However, smaller angles of approach of the air provide longer and hence thinner fibers from the extruded material. The nozzle disclosed in the Wente article therefore is restricted in its ability to form microfine fibres since a compromise angle must be chosen. The necessity to operate in this manner results from close proximity of the extrusion holes to each other in the Wente construction.

The novel extrusion head of the present invention is designed to overcome these prior art problems.

SUMMARY OF THE INVENTION

The present invention provides an extrusion head for a molten polymeric material extruder which includes individual conduits for the extruded material to convey the molten material from its source to the exterior of the head. Associated with each individual conduit is a hot air stream moving substantially parallel thereto, the hot air streams being provided from a single source.

Thus in the present invention individual air streams are associated with individual extrusion nozzles and the air streams have an approximately zero approach angle and hence are able to produce long and thin fibres which, due to the individual association of air streams and extrusion nozzles and hence the effective separation of fibres one from another by the air stream at least during the period immediately after extrusion, do not tend to form bundles of fibres.

The present invention also provides a polymeric fibre-forming apparatus including the extrusion head. The fibre-forming apparatus includes an extruder equipped with the novel extrusion head, a fibre collecting surface and a shield tunnel extending from the extruder to the collecting surface.

DESCRIPTION OF PREFERRED EMBODIMENTS

Figure 1:
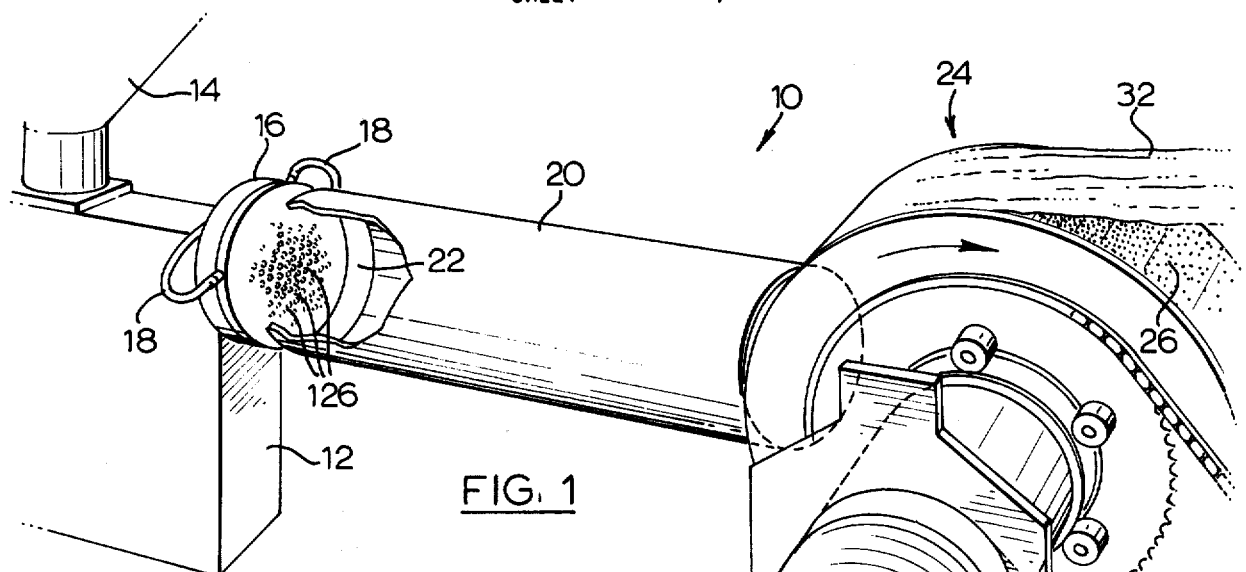
FIG. 1 is a perspective view of an apparatus for forming a mat of polymeric fibres in accordance with one embodiment of the invention.

An apparatus 10 for forming a mat of polymeric fibres having fibre diameters less than 5 microns includes an extruder 12 of any convenient construction capable of extruding molten thermoplastic polymeric material. A hopper 14 holds feed thermoplastic polymeric material.

The polymeric material fed from the hopper 14 to the extruder 12 may be any natural or synthetic thermoplastic polymeric material capable of extrusion as a molten mass and capable of formation into fibres in the manner described below. Where the fibres are to be used in tobacco smoke filters in accordance with a preferred aspect of this invention, the thermoplastic polymeric material must be capable of withstanding the temperature of the tobacco smoke without substantial degradation and must be substantially inert to chemical attack by the tobacco smoke.

Typical examples of the polymeric materials which may be used are polymers or copolymers of olefins, polymerizable esters and polymerizable amides. Polyolefins which may be employed include polyethylene, polypropylene and polymers of substituted olefins, such as polytrifluorochloroethylene. Many polyesters may be used, such as polyethylene terephthalate and poly(methylmethacrylate). A typical poly (methylmethacrylate) which may be used is that sold under the trade mark "ACRYLITE" H.12. Among the polyamides which may be utilized are nylon 6, nylon 66 and nylon 610. Other thermoplastic polymeric materials such as polystyrene also may be employed.

Normally a single polymeric material is fed from the hopper 14 to the extruder 12 although a mixture of two or more polymeric materials may be used, if desired.

The molten polymeric material is extruded through a substantially cylindrical extrusion head 16, described in more detail below in connection with FIGS. 2 to 4. The polymeric material is extruded and formed into fibres by high speed hot air, or other convenient gas fed by lines 18. The resulting molten fibres pass into an elongate tube 20 as a rapidly-flowing mass of fibres and air. The elongate tube 20 confines the fibres and reduces the volume of gas which the hot gas-fibres mixture is able to draw into it during its movement, and hence the volume of air which needs to be handled on collection of the fibres. The tube 20 which generally has a diameter substantially that of the extrusion head 16, is spaced from the extrusion head 16 to allow a quantity of cooling air to be drawn into the tube 20 by the flowing mass of air and fibres through the gap 22. In this way, the fibres are cooled and solidified as individual fibres when they emerge from the opposite end of the tube 20, and the quantity of air associated with the fibres is at a manageable level.

A foraminous drum 24, having an air-permeable but fibre-impermeable surface 26, is rotated about a horizontal axis by drive chain 28 with its external surface 26 in the path of the fibres. The fibres are collected as a mat on the surface 26, vacuum being applied to the underneath of the surface 26 by a vacuum pipe 30 to remove the air which is mixed with the fibres and emerging from the tube 20.

The thickness of the mat of fibres collected on the surface 26 of the drum 24 depends on the speed of rotation of the drum 24. Further, the width of the mat of fibres may be controlled by the spacing of the surface 26 of the drum 24 from the adjacent end of the tube 20. The minimum width of the mat of fibres collected on the surface 26 is dictated by the diameter of the tube 20. As the surface 26 of the drum 24 becomes spaced increasing distances from the adjacent end of the tube 20, the width of the mat becomes greater. Any other convenient collection technique for the fibres may be utilized.

The mat of fibres collected on the surface 26 generally consists of a plurality of individually long fibres and is self-sustaining and may be removed from the drum surface 26 in any convenient manner as a continuous sheet 32, which passes to storage or to further processing as desired.

The use of the apparatus of FIG. 1 in a procedure for providing cigarette filters in accordance with the abovementioned copending application Ser. No. 352,868 is described below with reference to FIG. 5.

Figure 2:
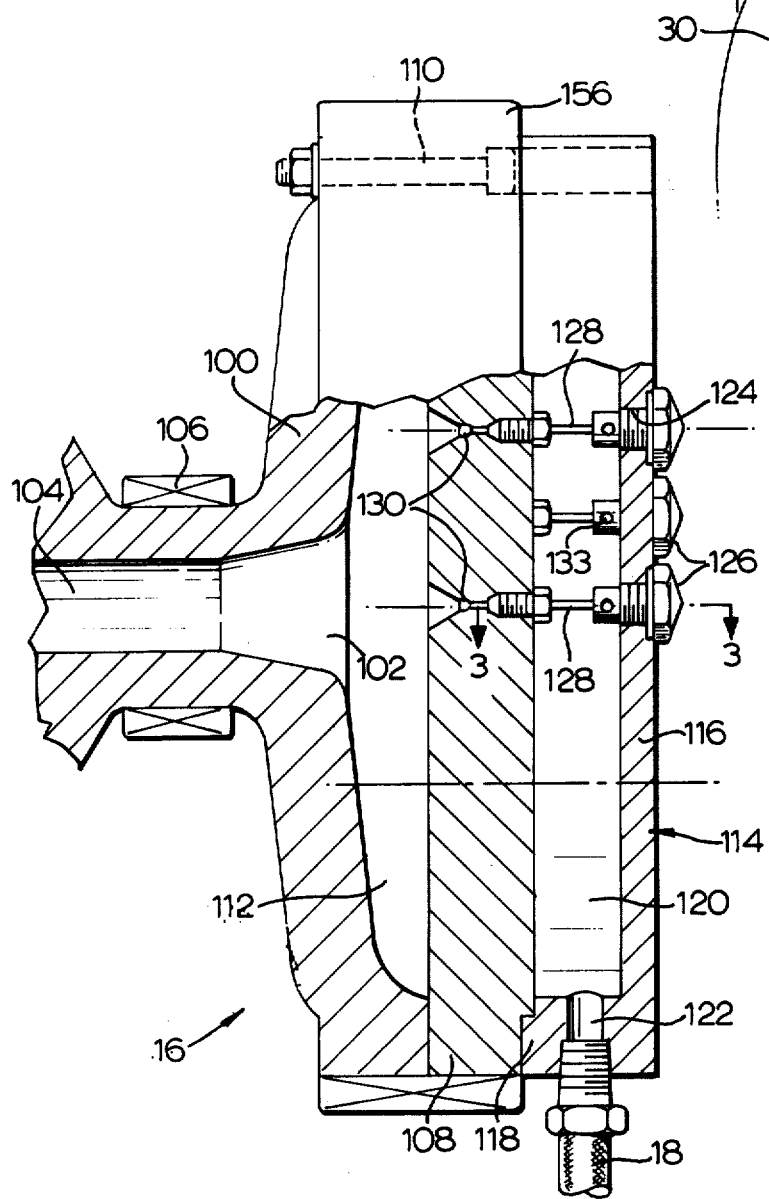
FIG. 2 is a part-sectional view of the extrusion head used in the apparatus of FIG. 1.
Figures 3, 4:
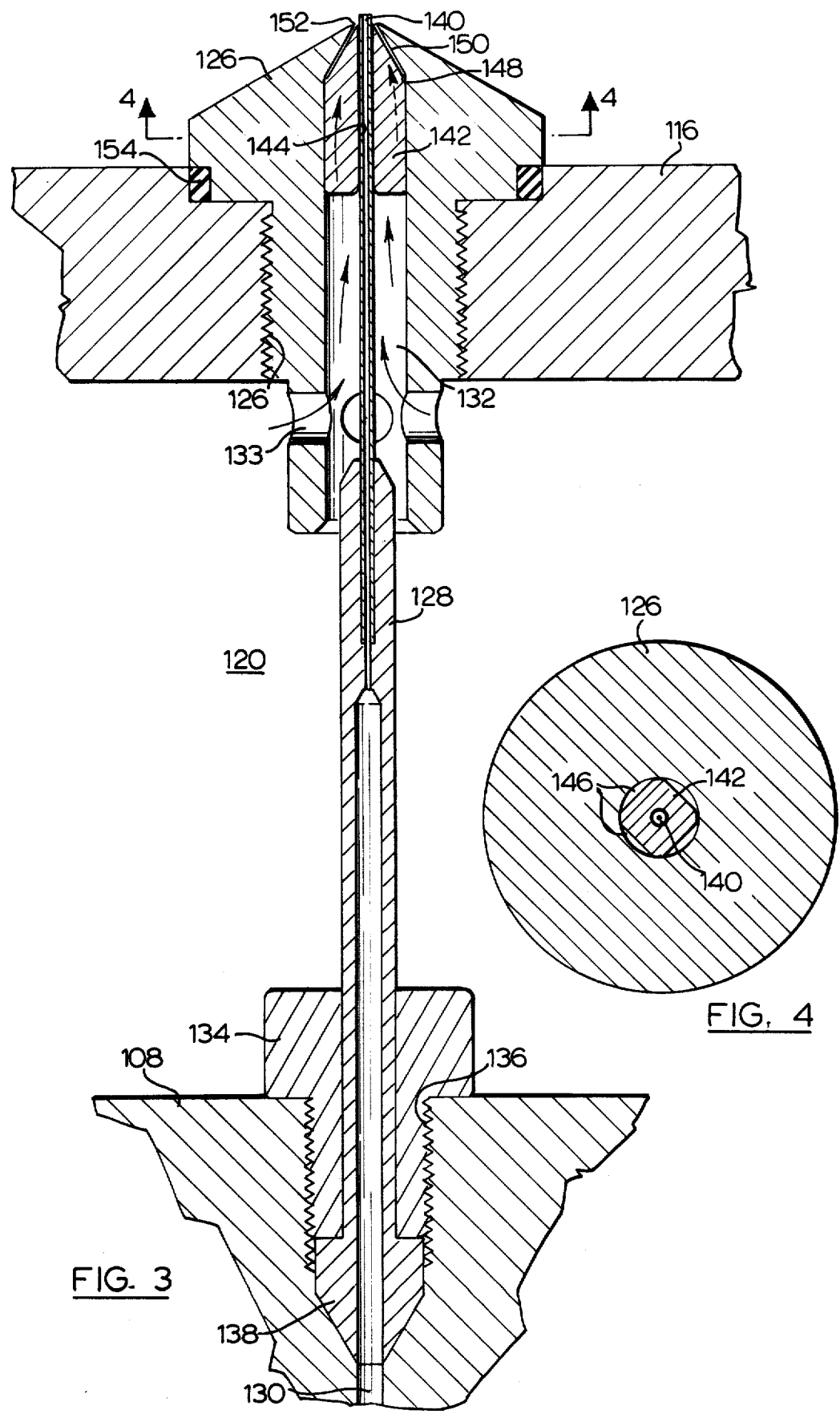
FIG. 3 is a sectional view taken on line 3—3 of FIG. 2.
FIG. 4 is a sectional view, taken on line 4—4 of FIG. 3.

The extrusion head 16 of the apparatus of FIG. 1 is illustrated more particularly in FIGS. 2 to 4 and reference now is made to the latter figures.

The extrusion head 16 has a generally cylindrical shape, although any other convenient shape could be employed. A dished annularly flanged member 100 has a central axial opening 102 communicating with the molten polymeric material in the extruder 12 by passageway 104. A heating element 106 surrounds the passageway 104 to maintain the polymeric material molten during movement through the passageway 104.

A circular plate 108 of diameter substantially the same as that of the dished member 100 is bolted by bolts 110 or otherwise attached, thereto, defining with the dished member chamber 112 which will constitute a source of molten polymeric material for the head 16.

A location pin may be provided to aid in aligning the bolt holes in the circular plate 108 with the socket holes in the annular flange of the dished member 100.

A cylindrical element 114 is bolted or otherwise secured, to the circular plate 108. A location pin may be provided to assist in alignment of the bolt holes in element 114 with the bolt sockets and holes in the circular plate 108.

The element 114 is of substantially the same diameter as the circular plate 108 and consists of a disc 116 and a depending integral cylindrical skirt 118 which engages the circular plate 108. The element 114 thereby defines with the circular plate 108 a hollow chamber 120, which is out of fluid flow communication with the chamber 112.

Inlets 122 (only one of which is shown in FIG. 2) are provided in the skirt 118 for introducing hot air under pressure to the chamber 120 by lines 18. An air temperature sensor may be provided in the chamber 120, if desired, and mounted in a suitable opening in the skirt 118.

A plurality of openings 124 is produced through the disc 116 from the chamber 120 to the outer surface of the disc 116. Screw mounted, or otherwise removably secured in each opening 124 is a button 126, the structure of which may more clearly be seen in FIGS. 3 and 4.

A large number of the buttons 126 usually is provided, arranged in circles. Each button 126 usually is spaced equidistant from adjacent buttons and three adjacent buttons define the apices of an isosceles triangle.

A plurality of narrow conduits 128 extends from the circular part 108 through the chamber 120 to the exterior of the disc 116. The narrow conduits 128 are in fluid flow communication with the chamber 112 through openings 130 formed through the circular plate 108 from the chamber 112 to the chamber 120. The narrow conduits 128, however, are out of fluid flow communication with the chamber 120. The narrow conduits 128 are screwed into or otherwise removably secured in the openings 130 in the circular plate 108, as will be more particularly described with reference to FIGS. 3 and 4.

The hot air situated in the chamber 120 generally is at a higher temperature than the molten polymeric material in the chamber 112, and hence the hot air tends to heat the extruded fibres by heat transfer through the walls of the narrow conduits 128 and through the circular plate 108, and the fibres generally are extruded substantially at the temperature of the hot air.

As may be seen in FIGS. 3 and 4, each button 126 has an axial bore 132 which is in fluid flow communication with the hot air under pressure in chamber 120 through openings 133. Each of the narrow conduits 128 is removably secured to the circular plate 108 by a threaded member 134 which is in threaded engagement with a threaded portion 136 of the bore 130 in the circular plate 108. The threaded member 134 engages and secures an enlarged diameter end 138 of the conduit 128.

At the end of the narrow conduit 128 remote from its securement to the circular plate 108 is a hollow needle conduit 140 which extends through the bore 132 in the button 126 and projects a short distance from the outer surface of the button 126.

An air flow guide member and conduit positioning means 142 is positioned in the bore 132 and has an axial bore 144 therethrough. The needle conduit 140 projects through the bore 144. Preferably the bore 144 is dimensioned to engage the needle conduit 140.

The guide member 142 is substantially square in cross section, as may be seen in FIG. 4, although other cross sections may be used, and defines air flow passageways 146 between the outer surfaces of the guide member 142 and the wall of the bore 132. The guide member 142 also is conically tapered, shoulders 148 being provided to space the conical portion of the guide member 142 from the similarly tapering end of bore 132 to define an air flow passageway 150.

The guide member 142 may be secured in the bore 132 in the illustrated position or may be loosely positioned therein, with the air pressure from the chamber 120 maintaining the guide member 142 in a substantially fixed position during use.

In addition to providing an air flow stream through orifice 152 between the needle conduit 140 and the bore 136 in the button 126 which forms fibres from the molten polymeric material extruded through the needle conduit 140, the guide member 142 supports the downstream end of the conduits 128 and hence substantially prevents the needle conduit 140 from altering its position in the bore 132 due to the air pressure.

A ring seal element 154 may be provided between each button 126 and the disc 116. A heating element 156 is positioned in engagement with the outer walls of the circular plate 108 and the dished element 100 to maintain the polymeric material molten.

The presence of the narrow conduits 128 allows the molten polymeric material to be extruded from the chamber 112 as a plurality of fine filaments. The bores 132 in the buttons 126 allow hot air under pressure from the chamber 120 to be projected at high velocity through the orifice 152 substantially parallel to each individual needle conduit 140 at its discharge point.

This construction allows attenuation of fibres in microfine diameters without objectionable formation of occasional large size drops, or bundles of fibres. In addition, since the narrow conduits 128 are removably secured to the circular plate 108, they can be replaced as and when they wear out. Further, since the buttons 126 similarly are removably secured to the disc 116, they too may be readily replaced.

The possibility of replacing inexpensively those parts of the extrusion head which may become worn during use avoids the necessity of providing, when wearing has occurred, a completely new and hence expensive nozzle arrangement, as is the case in the structure described in the Wente article described above.

Where the material to be extruded is "acrylite" H 12, typical temperatures for the molten material in the passageway 104 range from about 525° to 535°F, with the air stream in the chamber 128 having a temperature in the range of about 700° to about 770°F, preferably about 735°F.

Air may be carried to flow through the orifices 152 at a speed of at least 1000 ft/sec., preferably about 1 10 ft/sec., the inner wall of the bores 132 being spaced an average distance of about 30 to 40 thousandths of an inch from the outer surface of the needle conduit 140 at the orifices 152. In such an operation, the inside diameter of the needle conduit 140 may vary from about 5 to about 20 thousandths of an inch, preferably about 16 thousandths of an inch while the outer diameter may vary between about 23 and about 33 thousandths of an inch, preferably about 28 thousandths of an inch.

When needle conduits 140 and orifices 152 conforming to these values are used the needle conduits 140 may project from the outer surface of the buttons 126 a distance from about 15 to about 25 thousandths of an inch, preferably about 20 thousandths of an inch. In a particularly preferred arrangement, the needle conduits 140 have an inside diameter of 16 thousandths of an inch, an outside diameter of 28 thousandths of an inch, the passage 132 has a diameter 60 thousandths of an inch at the orifice 152 and the projection of the needle conduits 140 is 20 thousandths of an inch.

Figure 5:
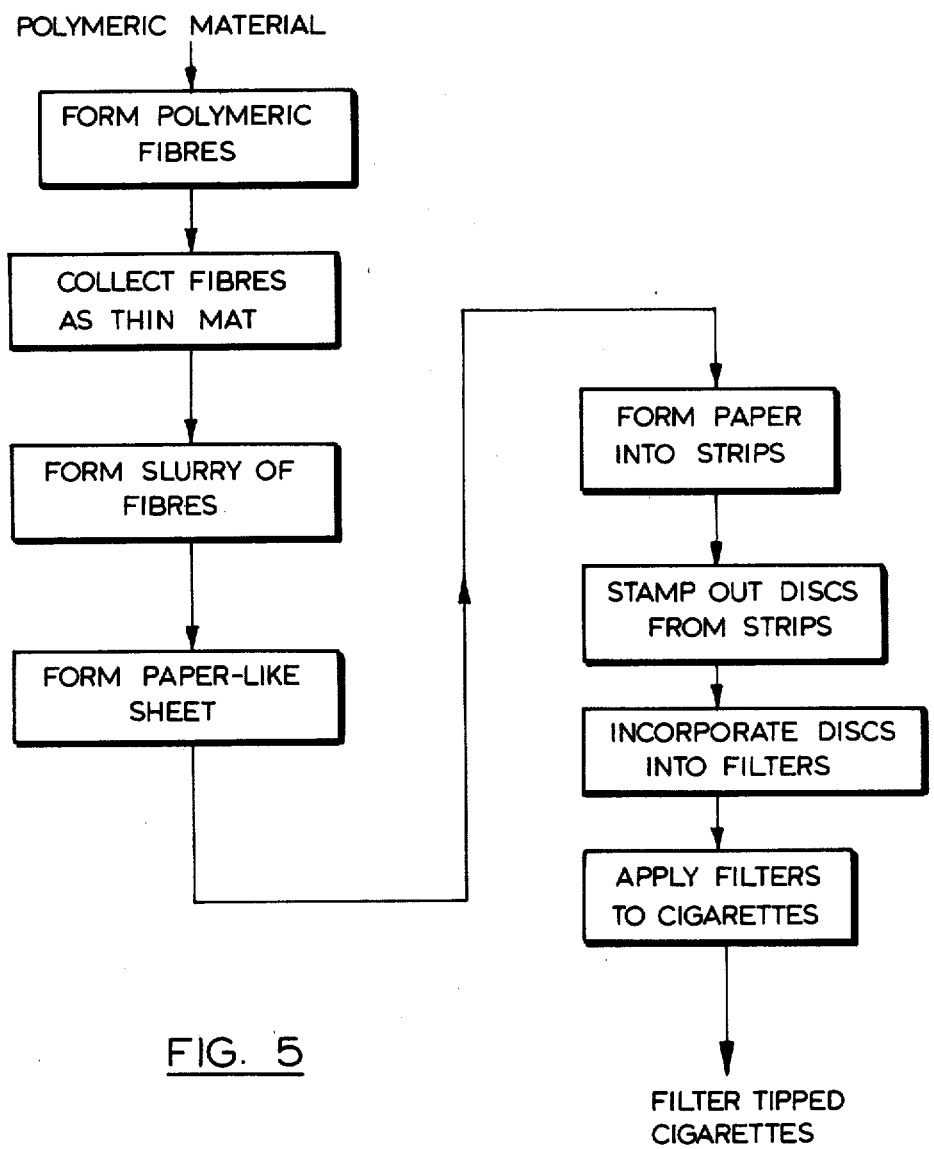
FIG. 5 is a schematic flow sheet of a method of forming cigarette filters in accordance with an embodiment of the invention.

The apparatus described with reference to FIG. 1 may be used to form filters for tobacco smoke, particularly cigarette filters, of the type defined in copending application Ser. No. 352,868 discussed above. A procedure which may be adopted to provide cigarettes including such filters is illustrated in FIG. 5. Polymeric thermoplastic material, which may be any of the materials discussed above with reference to FIG. 1, is used to form fibres, preferably in a fibre-forming apparatus of the type described above with reference to FIGS. 1 to 4.

The polymeric fibres are collected as a thin mat, typically in the manner illustrated in FIG. 1. The mat of fibres, in which the diameters all are less than 5 microns, preferably an average diameter below 2 microns, consists mainly of long fibres which are located substantially in the plane of the mat.

The fibres then are slurried with water, with a small amount of a wetting agent being added, if desired. The fibres in the slurry are reduced in length if required, such as by beating, to staple fibre length. The resulting slurry, in which the fibres generally have substantially the same length, then is formed into a paper-like sheet. This may be achieved in any convenient manner, typically by feeding slurry to a foraminous belt which allows the aqueous medium to pass therethrough but not allowing the fibres to pass therethrough. The fibres felt and mat together to provide a paper-like product. It is preferred to provide a backing for the felted fibres, by first positioning the backing, typically a porous cellulose material, on the foraminous belt and then introducing the slurry on top of the backing.

The mat having the backing then is dried and slit into strips which are separated from each other. The width of the strips typically is about the width of the filter element required.

Discs are punched from the strips to provide a plurality of individual tobacco smoke filter elements consisting wholly of thermoplastic polymeric fibres of diameter less than 5 microns. The polymeric fibres in the discs are positioned substantially in the plane of the disc. While these elements may be used alone as tobacco smoke filters, it is preferred, when they are to be used in cigarettes, to provide such elements as one of a plurality of filter elements.

As described in copending application Ser. No. 352,868, a three-component filter may be provided which comprises a pair of tubular cellulose acetate filter plugs located within a holder and spaced apart from each other, the disc being positioned in the gap between the two cellulose acetate plugs.

The incorporation of the discs into this type of filter may be carried out in any convenient manner. For example, the first cellulose acetate plug may be situated in the holder, the disc is positioned in contact with the first plug and then the second cellulose acetate plug is positioned in the holder in contact with the disc. The elements are sealed in position in any convenient manner.

Since the disc is located transverse to the path of the tobacco smoke through the filter and the microfine polymeric fibres in the disc are located substantially in the plane of the disc, the fibres are able efficiently to contact the particles in the smoke and remove them therefrom. The mechanism of removal of tar and nicotine values from the tobacco smoke without affecting draw and taste characteristics is described fully in copending application Ser. No. 352,868 mentioned above.

The filters provided as described above then are applied to cigarettes in any convenient manner to provide filter-tipped cigarettes.

EXAMPLE

The invention is illustrated further by the following Example:

An apparatus of the type illustrated in FIGS. 1 to 4 was set up to produce a mat of Acrylite H 12 fibres. Acrylite was extruded at a temperature of about 530°F through an extrusion head of the type illustrated in FIGS. 2 to 4 having a diameter at the polymeric extrusion face of 18 inches and having 127 conduits 140 of outside diameter of 28 thousandths of an inch (thou) and inside diameter of 16 thou. Each conduit 140 was centrally located in a bore 132 of diameter 59 thou and projected 20 thou from the external surface of the appropriate button 126.

Air at 60 lbs pressure was supplied to the chamber 120 and the flow rate of the air at each conduit 140 was 1½ cubic feet per minute. The air was supplied to the chamber 120 at a temperature of about 750°F.

The resulting mixture of air and Acrylite filaments was passed into pipe 20 of inside diameter 18 inches and length 6 feet, spaced a distance of 4 inches from the head 16. The solidified fibres were collected as a mat on the drum surface 26 moving at a speed of 60 feet per minute and positioned ¾ inch from the exit of the pipe 20, thus resulting in a mat of average thickness about ⅜ inch. Vacuum was applied to the underside of the surface to remove the air accompanying the fibres.

Examination of the mat provided by this procedure revealed a mass of elongate fibres of average diameter 1.5 to 2 microns.

Modifications are possible within the scope of the invention.

What we claim is:
1. An extrusion head comprising:
   a body,
   an inlet orifice and passageway situated at one end of said body and adapted to communicate with a source of molten metal to be extruded,
   a first hollow chamber formed in said body immediately adjacent and in fluid flow communication with said inlet orifice to receive the molten material therein,
   a second hollow chamber in said body spaced from the inlet orifice a greater distance than said first hollow chamber,
   a first plate separating said first and second hollow chambers and maintaining said second hollow chamber out of fluid flow communication with said first hollow chamber,
   at least one inlet orifice communicating with said second hollow chamber, means to connect said at least one inlet orifice to a source of a heated gas under pressure,
   a plurality of narrow conduits each in fluid flow communication with said first hollow chamber through an individual aperture in said first plate and freely extending through said second hollow chamber out of fluid flow communication with said second hollow chamber,
   said second hollow chamber being defined by a second plate spaced from said first plate and a skirt integral therewith extending towards and contacting said first plate,
   said second plate having a plurality of outlet orifices therein, the number of said plurality of outlet orifices equalling the number of said plurality of narrow conduits each one of which extends through a different one of the plurality of outlet orifices, and
   means in said outlet orifices adapted to allow hot gas under pressure to be projected at high velocity from said second hollow chamber substantially parallel to each individual narrow conduit.

2. The extrusion head of claim 1 wherein said first and second plates are circular and have substantially the same diameter.

3. The extrusion head of claim 1 wherein said plurality of narrow conduits is releasably mounted in said first plate.

4. The extrusion head of claim 3 wherein said second plate has a plurality of openings therein, the number corresponding to the number of said plurality of outlet orifices, and said means in said outlets orifices includes a plurality of buttons removably located one in each of said plurality of openings in said second plate, each of said buttons having an axial bore of substantially circular cross section for guiding the hot gas under pressure out of said second hollow chamber in said substantially parallel relation to each individual narrow conduit.

5. The extrusion head of claim 4 wherein each of said plurality of narrow conduits terminates exterior of a different bore.

6. The extrusion head of claim 5 wherein each of said buttons has a relatively wide axial bore therethrough which tapers adjacent its downstream end to a substantially circular orifice having a diameter slightly in excess of the diameter of the narrow conduit.

7. The extrusion head of claim 6 including conduit positioning means located in each said axial bore, each said conduit positioning means contacting one of said narrow conduits and positioning said one narrow conduit substantially centrally in the orifice.

8. The extrusion head of claim 7 wherein the bore in each button has a substantially circular cross-section and each of said conduit positioning means has a generally square cross-section the diagonal distance of which is substantially the width of the bore and has a generally conical section corresponding substantially to the taper of said bore, each said conduit positioning means including locating means to space said conical section from the taper of said bore.

9. The extrusion head of claim 8 wherein said locating means comprises shoulders on said conduit positioning means engaging said taper of said bore.

10. The extrusion head of claim 9 wherein said conduit positioning means includes a central bore of diameter substantially that of said hollow conduit which extends through said central bore, said conduit positioning means being freely movable axially of the hollow conduit.

11. The extrusion head of claim 1 wherein said body further includes a dished member having a circular flange engaging said first plate on the opposite side thereof from said skirt, said dished member defining with said first plate said first hollow chamber, said dished member having a central axial opening constituting said inlet orifice.

12. The extrusion head of claim 11 including heating means associated with said body.

13. The extrusion head of claim 4 wherein said plurality of buttons is arranged in a plurality of concentric circles with each adjacent three buttons constituting the apices of isosceles triangles and all the buttons spaced substantially equidistant from each other.

* * * * *